T. SHAW.
Cushion-Seated Valves.
No. 152,179.            Patented June 16, 1874.
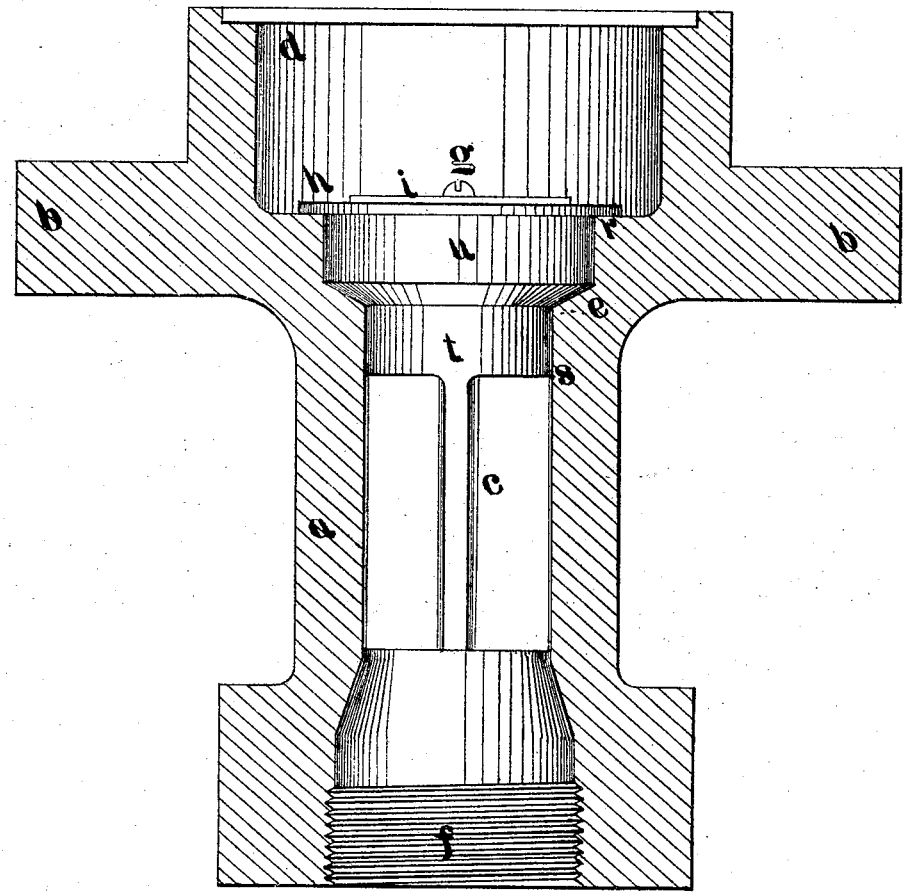
Witnesses,
Inventor,
Thomas Shaw

UNITED STATES PATENT OFFICE.

THOMAS SHAW, OF PHILADELPHIA, PENNSYLVANIA.

IMPROVEMENT IN CUSHION-SEATED VALVES.

Specification forming part of Letters Patent No. 152,179, dated June 16, 1874; application filed November 21, 1873.

*To all whom it may concern:*

Be it known that I, THOMAS SHAW, of the city and county of Philadelphia, Pennsylvania, have invented a new and Improved Steam, Air, and Hydraulic Cushion-Seated Valve; and I hereby declare the following to be a full, clear, and exact description of the same, reference being had to the accompanying drawing, and to the letters of reference marked thereon.

My invention consists in the construction of a valve with plunger or piston heads projecting from its seat, in the manner and for the purpose hereinafter described, and in the provision of a hydraulic packing on the top of the valve, all for the purpose hereinafter described. The object of the invention is to enable a rapid stroke of valve under high pressure, without pounding or injuring the seat of the valve, and to make a tight valve under heavy pressure.

In order to enable others to use and practice my invention, I will proceed to describe its construction and operation.

On reference to the accompanying drawings, which form part of this specification, the sketch represents a vertical section through valve-box $a$, of which $f$ is the inlet end, and $d$ the outlet-chamber. $b\ b$ are flanges, to enable bolting to ordinary cap, connected with the outlet-pipe. The valve $c$ is provided with plunger or piston heads $t$ and $u$, which form part of the valve. $h$ is a thin gum disk, located on top of valve, and is secured in place by washer $i$ and screw $g$.

The valve has a long stroke during its operation, as it is required to make a stroke equal to the length of the plunger or piston before any fluid is allowed to pass, and on its return stroke it is held suspended for a temporary period, and can only gently close down upon its seat more or less rapidly in proportion as the fluid escapes around the piston-head, for it will be observed that, in the return stroke the piston $u$, when entering its cylinder at $r$, and the piston $t$ when entering its cylinder at $e$, there is an imprisoned fluid in all the area of the valve-seat, for the distances equaling the length of stroke of piston, and that the imprisoned fluid can only escape by leakage around the piston, which is so slow a process that the valve is required to make a return stroke before the valve has reached its seat, the tight joint in the meantime being made by the imprisoned fluid. This enables a valve to work rapidly under heavy pressure without shock to machinery or wear to the seat.

The gum disk secures a perfectly tight joint when the valve is brought to its seat.

It will be evident that this method of cushioning the seat of valves can be considerably modified, as, for instance, on the double-seated cornish valve, without any alteration in the result.

What I claim, and desire to secure by Letters Patent, is—

1. The plunger or piston heads $u$ and $t$, projecting from the seat of valve $c$, in combination with the cylinders $r$ and $e$, for the described purpose of forming the cushioned seat, substantially as described.

2. The combination of a flexible disk, $h$, with valve $c$, for the purpose set forth.

THOMAS SHAW.

Witnesses:
  WM. F. BREY,
  WM. GARWOOD.